(12) United States Patent
Carro (10) Patent No.: US 8,116,438 B2
(45) Date of Patent: *Feb. 14, 2012

(54) SYSTEM FOR PROVIDING TELEPHONIC VOICE RESPONSE INFORMATION RELATED TO ITEMS MARKED ON PHYSICAL DOCUMENTS

(75) Inventor: Fernando Incertis Carro, Valencia (ES)

(73) Assignee: International Business Machines Corporation, Armonk, NY (US)

( * ) Notice: Subject to any disclaimer, the term of this patent is extended or adjusted under 35 U.S.C. 154(b) by 787 days.

This patent is subject to a terminal disclaimer.

(21) Appl. No.: 12/173,471

(22) Filed: Jul. 15, 2008

(65) Prior Publication Data

US 2008/0279348 A1 Nov. 13, 2008

Related U.S. Application Data

(63) Continuation of application No. 10/996,245, filed on Nov. 23, 2004, now Pat. No. 7,414,925.

(30) Foreign Application Priority Data

Nov. 27, 2003 (EP) ..................................... 03368105

(51) Int. Cl.
*H04M 1/64* (2006.01)
(52) U.S. Cl. ................... 379/88.04; 379/88.14
(58) Field of Classification Search ............... 379/88.04, 379/88.14; 704/246
See application file for complete search history.

(56) References Cited

U.S. PATENT DOCUMENTS

| 5,097,528 | A | 3/1992 | Gursahaney et al. |
| 5,495,581 | A | 2/1996 | Tsai |
| 5,640,193 | A | 6/1997 | Wellner |
| 5,768,426 | A | 6/1998 | Rhoads |
| 5,903,729 | A | 5/1999 | Reber et al. |
| 5,905,251 | A | 5/1999 | Knowles |
| 6,311,214 | B1 | 10/2001 | Rhoads |
| 6,345,104 | B1 | 2/2002 | Rhoads |
| 6,408,331 | B1 | 6/2002 | Rhoads |
| 6,418,199 | B1 | 7/2002 | Perrone |
| 6,445,468 | B1 | 9/2002 | Tsai |
| 6,536,670 | B1 | 3/2003 | Postman et al. |
| 6,804,333 | B1 | 10/2004 | Liu et al. |
| 7,414,925 | B2 * | 8/2008 | Carro ..................... 369/29.01 |
| 7,864,929 | B2 * | 1/2011 | Carro ..................... 379/88.04 |
| 2001/0041562 | A1 | 11/2001 | Elsey et al. |
| 2001/0056439 | A1 | 12/2001 | Carro |
| 2002/0003493 | A1 | 1/2002 | Durst et al. |
| 2002/0065828 | A1 | 5/2002 | Goodspeed |
| 2002/0077086 | A1 | 6/2002 | Tuomela et al. |
| 2003/0009334 | A1 | 1/2003 | Printz et al. |
| 2003/0024975 | A1 | 2/2003 | Rajasekharan |
| 2003/0077086 | A1 | 4/2003 | Phillips |
| 2003/0078779 | A1 | 4/2003 | Desai et al. |
| 2003/0191852 | A1 * | 10/2003 | Incertis ..................... 709/232 |
| 2004/0167895 | A1 * | 8/2004 | Carro ..................... 707/9 |

* cited by examiner

*Primary Examiner* — Creighton Smith
(74) *Attorney, Agent, or Firm* — Schmeiser, Olsen & Watts; John Pivnichny (57) ABSTRACT

A system to telephonically access information related with items printed on a physical document. Items marked on the physical document or on any other physical surface is touched with a finger. The system includes a touch foil placed over (or under) the document, for reading the coordinates of selected marked items, a telephone set for receiving the coordinates of the items selected by the user and for dialing to an interactive voice response (IVR) service used for accessing and retrieving selected hyperlinked documents from the web through a documents proxy server, for converting retrieved documents to synthesized speech, and for providing to the user through the telephone network, the selected documents that have been converted into speech.

3 Claims, 7 Drawing Sheets

SYSTEM FOR PROVIDING TELEPHONIC VOICE RESPONSE INFORMATION RELATED TO ITEMS MARKED ON PHYSICAL DOCUMENTS

This application is a continuation application claiming priority to Ser. No. 10/996,245, filed Nov. 23, 2004, now U.S. Pat. No. 7,414,925, issued Aug. 19, 2008.

FIELD OF THE INVENTION

The present invention relates to user interfaces for telephony access to interactive voice response systems, and more particularly to a system, method and apparatus for making available through a telephone network content resources related to items selected by users on physical documents.

BACKGROUND OF THE INVENTION

Interactive electronic services, video-on-demand, and the World Wide Web are providing access to an increasing offering of movies, shopping information, games, multimedia documents, electronic commerce and many other services. During the last few years, due mainly to the widespread use of personal computers and the near universal access of millions of users to the World Wide Web, an enormous amount of hypermedia information combining text, images and sounds is accessible via the Internet on the World Wide Web.

While the growth of the Internet as a global medium for communications and commerce has been driven, in part, by the increased availability of personal computers, distributed architecture and a common standard for application development which hides the intricacies of creating the graphical user interfaces from the developer, however, access to the Internet over a personal computer remains limited because consumers must have access to a computer and a working Internet connection.

Wireless access to the Internet over cellular telephones and other handheld devices has the potential to resolve the mobility and Internet connectivity issues presented by Internet access over a personal computer. However, while the number of mobile wireless devices has increased in recent years, display screens on these devices are small and the ability to input information using portable keyboards is constrained, limiting the usability and convenience of this solution. Therefore, the goal of anytime, anywhere access to a wide variety of information services has not yet been fully realized. Accordingly, there exists a need for enhanced online information access.

Even when the public's enthusiasm for new computer-based multimedia services has been seen by many analysts as a threat to the conventional forms of hard-copied publishing, particularly book publishing, the real fact is that, reading a book cannot be compared with reading electronic media. Reading paper remains preferable for most people, whether they are familiar with computers or not. Reading manuals and reports at work, textbooks at school, and menus at restaurants . . . and more generally reading printed material at any time and in any place is part of our daily lives. People can browse very easily through paper catalogs, magazines, newspapers, maps and books by flipping through the pages and by "glancing" at pictures and text. It is also very easy for them to mark and return to specific parts of a physical document.

It is easier and quicker to turn over pages of a book than to browse electronic pages on a computer screen. Many electronic systems attempt to replace paper. These offer, for example, a better access to multimedia services. However, most users prefer to work with paper and it is difficult to foresee, in the near future, a general and massive replacement of paper books by electronic books (e.g. by Web accessible e-books). As reported in an article entitled "Paper is still with us", by Philippa Jane Benson—The Journal of Electronic Publishing, published by the University of Michigan Press:

"Studies of professionals at work underscore three points that are critical to the design of scientific information: paper isn't going away, reading and writing are inextricably intertwined, and readers sample and navigate text according to specific purposes and tasks".

When we compare paper based information with computer based information, paper has a number of useful properties that computers cannot provide. For example:

paper is portable, familiar and can be easily distributed;
paper is easy to read, mark, and manipulate.

Notwithstanding the advantages described hereinabove, the most significant problem, of course, with traditional printed publications is that these cannot be changed, amended, updated nor completed. Accordingly, there exists a need for online information access from printed material.

Despite the Internet's growing acceptance, the telephone network is still more widely and readily accessible. Actually, telephone communications have become a tool of strategic importance. The telephone essentially allows people to communicate and businesses to operate. Everyday, people utilize the telephone system to conduct a broad range of personal and business transactions. Telephones are simple to operate and use the most natural form of communication, the human voice. Access to businesses and public information over the telephone is somewhat easier than access over the Internet because of the greater availability of landline and wireless telephones and the ease of use.

To increase the utility of telephones, a vast array of answering machines, voice mail, interactive voice response, automated call dispatching, forwarding services, and the like have been deployed. Each of these devices or services intends to increase the usefulness of the telephone in a specific way. Businesses have been using telephony based technologies like Interactive Voice Response (hereinafter referred to as "IVR") systems for communicating with customers and conducting business (e.g. contact centers, telemarketing, help lines, etc.). The proliferation of the wireless phone (i.e. cell phone) has made access to the telephone network even easier. Accordingly, there exists a need for enhanced telephone and online information access.

The widespread use of the Internet and mobile telephony offer many new opportunities to publishers and customers to combine electronic and printed media, i.e. to create "media-adaptive multimedia" products. The philosophy behind the concept of "media-adaptive multimedia" is that information has to be conveyed to customers in a form that is adaptable to their (multimedia) requirements. In fact, today there is a need to enhance traditional printed products with access to digitally stored information, using mobile telephony and voice response systems to access and retrieve information through an electronic network, such as the Internet—i.e. the convergence of printed information, telephony and web access.

To convey information to customers pervasively, in a form suitable to their requirements, new interfaces for accessing information from different media are required. The necessity of using a natural friendly interface for having access to information has been precisely summarized by Ann Light, in the article entitled "Fourteen Users in Search of a Newspaper: the Effect of Expectation on Online Behaviour", School of Cognitive and Computing Sciences, University of Sussex, CSRP 507:

"People expect the friendly familiar paradigm of media to guide them through uncharted territories of information".

Previous attempts to coordinate printed matter with external digital objects have used techniques based on optical sensing and decoding of digital data where data has been visibly encoded (e.g. using bar codes), or steganographically encoded using techniques similar to embedding watermarks, subliminal calibration patterns, or the like on the printed medium. Examples of some of these previous attempts can be found in the patents described hereinbelow.

U.S. Pat. No. 5,495,581 entitled "Method and Apparatus for Linking a Document with Associated Reference Information Using Pattern Matching" uses image scanning and pattern matching techniques. This patent discloses an apparatus for linking a portion of a document with associated reference information, wherein the linked portion is designated by a predetermined attribute of the received document image, using inter alia, a device for electronically scanning the electronic representation of the document image to locate said predetermined attribute of the document's image. A main drawback of this system is the need for use of bulky, non portable scanners, not being usable, therefore, in portable, mobile environments.

A similar approach using optical image scanners to access multimedia services is described in U.S. Pat. No. 5,640,193 entitled "Multimedia Service Access by Reading Marks on an Object". This patent discloses an apparatus and a method to enable a user to control the selection of electronic multimedia services using a scanner for reading marks on an object and for communicating a request signal, having an object code representing the read marks, to a user interface.

U.S. Pat. No. 5,903,729 entitled "Method, System, and Article of Manufacture for Navigating to a Resource in an Electronic Network", discloses a method for navigating on an electronic network. The method comprises the steps of:

forming an electronic image of an object having a plurality of markable regions associated with a plurality of electronic resources;

processing the electronic image to detect which of the markable regions associated with the plurality of electronic resources is marked;

generating a list comprising at least one link to at least one of the electronic resources whose associated markable region is marked, and displaying a display screen based upon the list.

The invention disclosed in U.S. Pat. No. 5,903,729 further requires image scanning and image processing means to read marked regions on hard-copied documents.

U.S. Pat. No. 5,768,426 entitled "Graphics processing system employing embedded code signals" discloses a system where an identification code signal is impressed on a carrier to be identified (such as an electronic data signal or a physical medium) in a manner that permits the identification signal later to be discerned and the carrier thereby identified.

U.S. Pat. No. 5,905,251 entitled "Hand-held Portable WWW Access Terminal with Visual Display Panel and GUI-based WWW Browser Program Integrated with Bar Code Symbol Reader in a Hand-supportable Housing" discloses a portable hand-held World Wide Web (hereinafter referred to as "WWW") access terminal for accessing HTML-encoded documents located on the WWW. The terminal includes a bar code symbol reader in a hand-supportable housing for reading URL-encoded symbols specifying the location of HTML-encoded documents stored in information servers connected to the Internet and supporting the TCP/IP standard. This invention requires the marking of physical documents with bar code symbols and requires bar code readers to trigger hyperlinks.

U.S. Pat. No. 6,311,214 entitled "Linking of computers based on optical sensing of digital data" discloses a system where a printed object, such as an item of postal mail, a book, printed advertising, a business card, or a product packaging, is steganographically encoded with plural-bit data. When such an object is presented to an optical sensor, the plural-bit data is decoded and used to establish a link to an internet address corresponding to that object.

Similarly, U.S. Pat. No. 6,408,331 entitled "Computer linking methods using encoded graphics" discloses a system and a method where a data object comprises both a graphic and embedded link information, such as the URL address of a network node, permitting the graphic object to serve as a link usable by an internet browser or the like.

U.S. Pat. No. 6,345,104 entitled "Digital watermarks and methods for security documents" deals with a system where security documents (e.g. passports, currency, event tickets, and the like) are encoded to convey machine-readable multi-bit binary information (e.g. a digital watermark), usually in a manner not alerting human viewers that such information is present. The documents can be provided with overt or subliminal calibration patterns. When a document incorporating such a pattern is scanned (e.g. by a photocopier), the pattern facilitates detection of the encoded information. A commercial product of this class, for embedding a digital watermark in an image, and means of detecting the watermark is provided by the Digimarc® MediaBridge™.

The systems, methods and products described hereinabove have the common drawback of requiring the use of specialized encoding and printing techniques for embedding codes, patterns or watermarks on printed materials, those techniques being non-standard in the printing industry. In fact, the requirement of modifying the original documents by printing coded information affects the integrity or even the readability of documents and represents a fundamental drawback of all these systems. Moreover, the end user must be provided with a specialized interface technology such as digital scanners or optical sensors for locating, sensing and decoding embedded information from publications printed using these techniques.

Based upon the analysis provided hereinabove of the different systems proposed heretofore for identifying, locating and accessing digital objects from printed matter, it would be a significant improvement to provide the possibility to access information related with items printed on a physical document, anytime and anywhere, directly from the same physical document, eliminating the need of requiring the use of specialized encoding and printing techniques for embedding codes, patterns or watermarks on the printed materials, and the need of using scanners or code readers for capturing and decoding said codes, patterns or watermarks identifying such information, while preventing errors and mistakes due to the manual capture of the coding of such items.

Accordingly, there is a need for systems and methods for improving printed texts with telephonically accessible, electronically stored data. In particular, there is a need for a system utilizing a telephone-based user interface capable of retrieving from the Web, and delivering to users, information related to items printed on physical documents.

OBJECTS AND SUMMARY OF THE INVENTION

It is an object of the present invention to improve the access by telephone users to information resources available on the Internet.

It is another object of the present invention to provide a system and a method for making available through a telephone network, content resources related to items selected by users on physical documents.

It is yet another object of the present invention to select in a direct and simple way, items printed or marked on physical documents before accessing content resources related to these selected items.

In accordance with one embodiment of the invention, there is provided a method for accessing information located on at least one web server using a user device having a telephone set connected to a network, wherein the information corresponds to an item printed or marked on a page of a physical document, the method comprising reading a phone number, a document identifier printed on the physical document, and a page identifier printed on a page of the physical document, and entering the phone number, the document identifier, and the page identifier in the user device, selecting on the user device, a location of an item printed or marked in the page of the physical document and determining corresponding location information, establishing a connection through the network by dialing the phone number read on the physical document, wherein the phone number is that of a server having an IVR server application, encoding as a dial string; an item identification comprising the document identifier, the page identifier, and the location information of the item, transmitting the dial string to the IVR server application using the established connection, receiving and decoding the dial string at the IVR server application, parsing the item identification from the decoded dial string and sending the item identification to a web proxy server application, collecting one or more web pages corresponding to the item identification and located on the at least one web server, using the web proxy server application, and sending the web pages to the IVR server application, transforming the web pages to synthetic voice information using the IVR server application having a text-to-speech synthesis application, sending the synthetic voice information to the user device through the connection established across the network, and receiving and playing the synthetic voice information on the telephone set of the user device.

In accordance with another embodiment of the invention, there is provided a method for accessing information located on at least one web server using a user device having a telephone set connected to a network, wherein the information corresponds to an item printed or marked on a page of a physical document, the method comprising reading a phone number, a document identifier printed on the physical document, and a page identifier printed on a page of the physical document, and entering the phone number, the document identifier, and the page identifier in the user device, selecting on the user device, a location of an item printed or marked in the page of the physical document and determining corresponding location information, establishing a connection through the network by dialing the phone number read on the physical document, wherein the phone number is that of a server having an IVR server application, encoding as a dial string, an item identification comprising the document identifier, the page identifier, and the location information of the item, transmitting the dial string to the IVR server application using the established connection, and receiving and playing the synthetic voice information on the telephone set of the user device.

In accordance with yet another embodiment of the invention, there is provided a method for providing information located on at least one web server using a user device having a telephone set connected to a network, wherein the information corresponds to an item printed or marked on a page of a physical document, the method comprising receiving and decoding a dial string at an IVR server application, parsing an item identification from the decoded dial string and sending the item identification to a web proxy server application, collecting one or more web pages corresponding to the item identification and located on the at least one web server, using the web proxy server application, and sending the web pages to the IVR server application, transforming the web pages to synthetic voice information using the IVR server application having a text-to-speech synthesis application, and sending the synthetic voice information to the user device through the connection established across the network.

In accordance with yet another embodiment of the invention, there is provided a system for accessing information located on at least one web server through a network, wherein the information corresponds to an item printed or marked on a page of a physical document, the system comprising a telephone set connected to the network for dialing a phone number, a document identifier printed on the physical document, and a page identifier printed on a page of the physical document, a touch foil connected to the telephone set for touching a location of an item printed or marked in the page of the physical document, and further for computing coordinates of the touched item location and communicating the coordinates to the telephone set, an IVR server application for receiving a dial string encoding an item identification comprising the physical document identifier, the page identifier, and the touched item location coordinates, and further for decoding and parsing the item identification from the dial string, a web proxy server application for receiving from the IVR server application the item identification, and for collecting one or more web pages corresponding to the item identification from the at least one web server, and further for sending the web pages to the IVR server application, a text-to-speech synthesis application for transforming the web pages received by the IVR server application into synthetic voice information, and further for sending the voice information to the telephone set using the network, wherein the telephone set plays the voice information.

Touching directly the objects we have around us is one of the simplest, most instinctive, and universal human actions. In fact, finger pointing and touching are the most natural forms of human/machine interface. The two main advantages of touching are:

Simplicity: Touching with the fingertip is the simplest and most intuitive form of pointing and selecting an item, and Versatility: Touching is particularly adapted to applications where the use of a keyboard, or a mouse is not well adapted to the user's service or comfort.

The action of touching is so simple and natural that navigating by means of touch screens requires virtually no training or learning. In fact, the pervasiveness, robustness and versatility of the "touch technology" is transforming the way people are living, working, learning, and playing.

Thus, there is a need in the art for a method and system to telephonically access information related to items printed on a physical document simply by touching those items on this physical document. People would be enabled to browse through paper catalogs, magazines, newspapers, maps and books, simply by touching with a fingertip, items (i.e. words, icons, figures, foot notes, etc.) printed on said publications, to select and to easily access, receive and hear, using a telephone set, information related to the selected items.

BEST MODE FOR CARRYING OUT THE INVENTION

The present invention relates to a system, method and apparatus for providing a user, through a telephone set and a telephonic network, voice response information retrieved from one or a plurality of servers connected to a communication network. The information retrieved, related to items marked on a physical document, is accessed simply by the user touching with a finger said marked items on said physical document.

The invention itself, as well as a preferred mode of use, objects and advantages thereof, can be understood by reference to the following illustrative embodiment described by the accompanying drawings.

Figure 1:
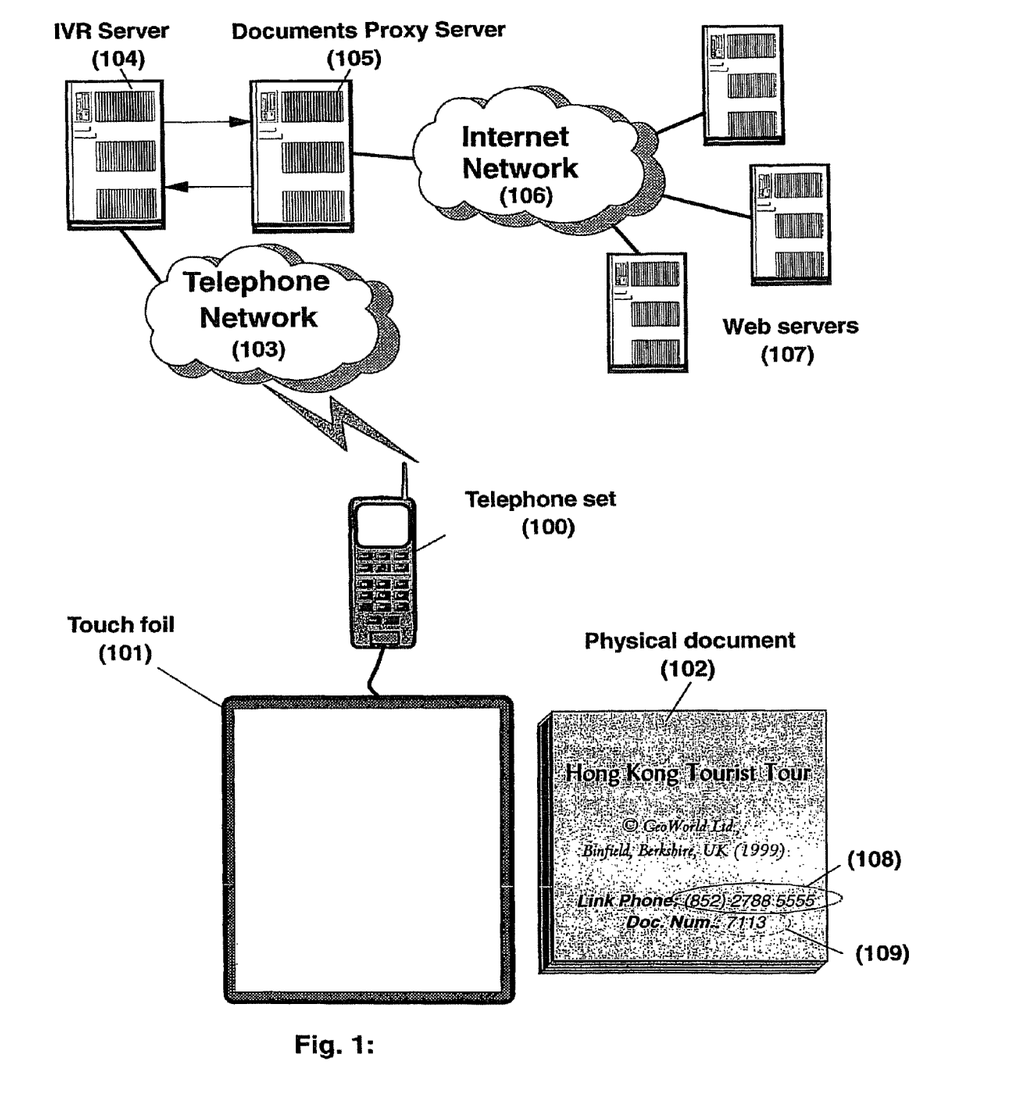
FIG. 1 shows main components of the system disclosed in accordance with one embodiment of the present invention.

In accordance with a first aspect of the invention, a system for providing telephonic access to information related to items marked on physical documents is disclosed by linking items marked on a physical document or on any other physical surface, with audible, telephonically accessible, related (i.e. hyperlinked) information. As shown in FIG. 1, the system according to the present invention, comprises the following components:
- physical document (102) (e.g. a book) comprising one or a plurality of pages, with printed marks identifying links from printed items to multimedia information and/or services on servers
- a physical document interface, comprising transparent touch foil (101)
- telephone set (100) (in one example, a cell phone), connected to touch foil (101)
- 1telephone network (103)
- IVR server (104)
- documents proxy server (105)
- communication network (106) (in one example, the Internet network)
- hyperlinked data servers (107) (in one example, web servers)

Physical document (102) can be of any kind, for example, a newspaper, a geographic map, a novel book, a text book, a technical book, a commercial catalog or even any other type of engraved or printed surface (e.g. a painting in a museum of art). The material of the document can be paper, plastic, wood or any other material. The marks identifying links from some items of the document to information or services on servers can be printed marks placed by the document's author or an editor (e.g. underlined or bold words). For example, each photograph or advertisement in a newspaper, magazine, or catalog or locations represented on a paper map can be accompanied by a printed mark.

Figure 4:
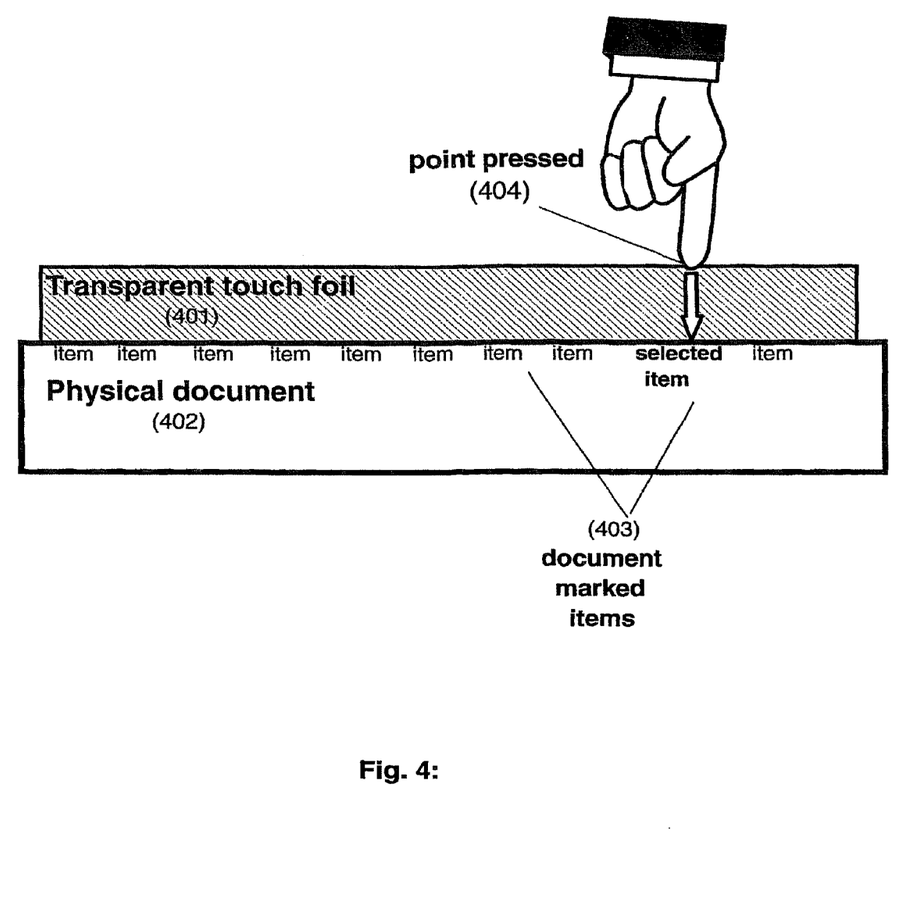
FIG. 4 shows a touch foil placed over a physical document in accordance with one embodiment of the present invention.
Figure 5:
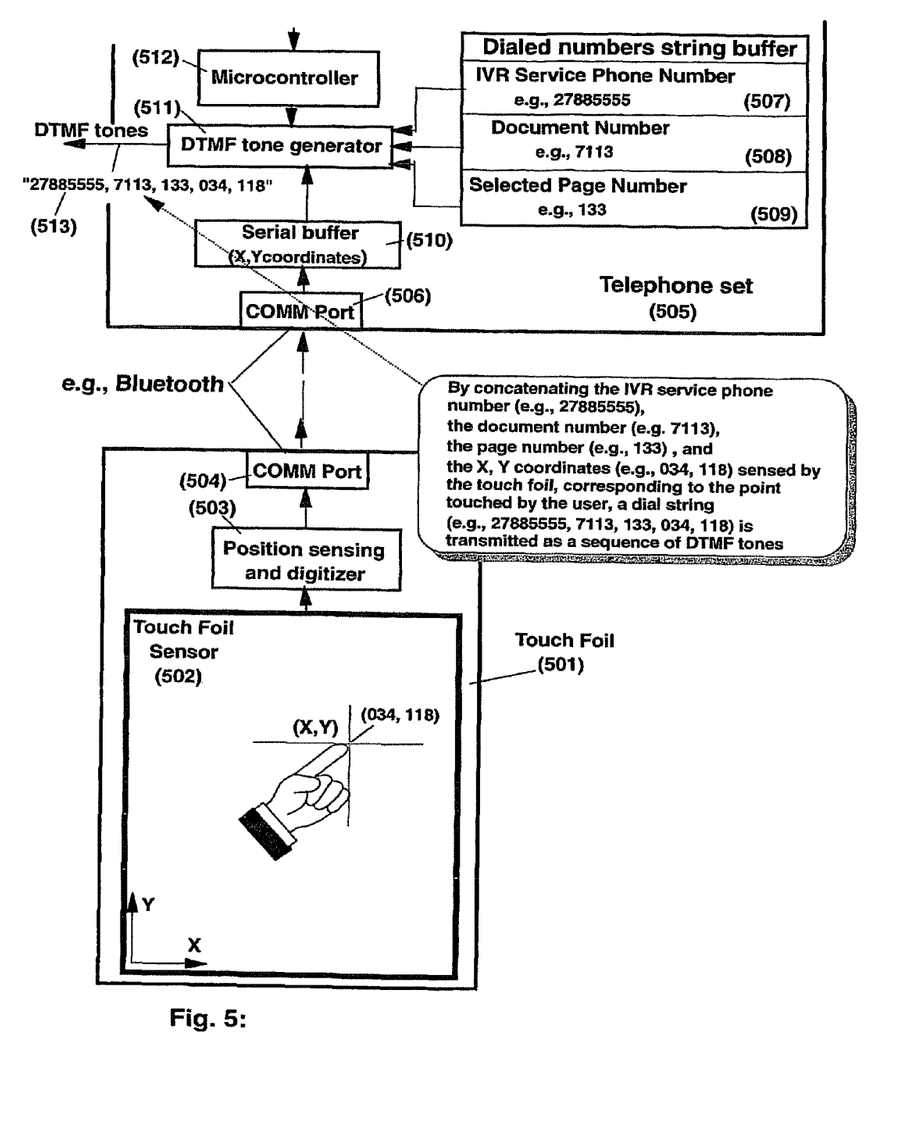
FIG. 5 shows functional components of a system for accessing a telephone network from a physical document through a user device in accordance with one embodiment of the present invention.

As respectively shown in FIGS. 1, 4 and 5 the system includes touch foil (101), (401), (501) to be placed aligned over (or under) a page of physical document (102), (402), for reading coordinates of document items (403) that are selected by the user when pressing (404) (in one example, by a fingertip) touch foil (101) over the corresponding marked items. Coordinates of points pressed that are read by touch foil (101) are transmitted to telephone set (100) where these are transformed to Dual-Tone Multi Frequency (hereinafter referred to as "DTMF") tones for telephonic signaling.

Touch foil (101), (401) may communicate with telephone set (100) over an infrared link, a serial wired connection or any other communication means (504) (in one example, by means of a wireless connection operating in the globally available 2.4 Ghz band of the "Bluetooth" specification, as promoted by the "Bluetooth Special Interest Group"). Cell phones having bluetooth connections are known, and presently available.

Touch foil sensor (502) may be made of transparent resistive or capacitive films of the type used commonly to manufacture touch screens. The generated signal is generally proportional to the coordinates of the point pressed (404). In one example, touch foil 401 and 501 could be implemented using TouchTek4 (4-wire Analog Resistive Touchscreens) of MICRO TOUCH company (TouchTek™ is a trademark of the MICRO TOUCH Company).

Telephone set (100), (505) can be any type of analog or digital phone set (in one example, a cellular phone), provided with communication port (506) able to receive and store coordinates (510) of the point(s) touched by the user on touch foil (101), (401), (501) and also having DTMF tone encoder and generator (511), able to encode and transmit numerical strings as sequences of DTMF tones.

In one embodiment of the invention, telephone set (100), (505) can be a bluetooth enabled cellular phone. One intended purpose of bluetooth phone technology is to enable cellular phones to provide device communications and personal area networking using bluetooth technology. Enabling cellular phones with bluetooth technology provides the ability to exchange personal information, MP3 files, etc. with short range devices such as PDAs, laptops, other cellular phones, or any kind of bluetooth enabled device (e.g. touch foil (501)). The cellular phone is also an ideal medium to access the Web to provide cordless e-mail and Internet access to notebook PCs when on the move. Examples of such cellular phones include: Motorola Bluetooth Headset model HSW-8000, Ericsson Bluetooth Headset model HBH-15, and Ericsson Bluetooth Headset model HBH-30.

An essential functional component of the system is the use of a DTMF decoder and encoder chip (511). For the purpose of the invention, this chip receives decimal digits and transforms these digits into DTMF tones, so as to encode a numerical sequence into DTMF tones.

DTMF signaling is the basis for voice communications control. Modern telephony uses DTMF to dial numbers, configure telephone exchanges (switchboards), and so on. It is used to transfer information between radio transceivers, in voice mail applications, etc. Almost any mobile (cellular) phone is able to generate DTMF tones after establishing a connection. DTMF was designed so that it is possible to use acoustic transfer, and receive the codes using a standard microphone.

DTMF tone generator (511) is integrated into telephone set (100), (505), as is commonly done on almost all cellular (mobile) phones. DTMF is a tone comprised of two sine waves of given frequencies. Individual frequencies are chosen so that it is quite easy to design frequency filters, and so that these frequencies can easily pass through telephone lines (where the maximum guaranteed bandwidth extends from about 300 Hz to 3.5 kHz). With standard decoders, it is possible to signal at a rate of about 10 "beeps" (equivalent to 5 bytes) per second. DTMF standards specify 50 ms tone and 50 ms space duration.

An example of a DTMF decoder and encoder chip is the CML Microcircuits CMX625 (CMX625 is a trademark of CML Microcircuits (USA) Inc.) which is an integrated telecom tone generator, DTMF encoder/decoder and PCM Codec-Filter designed for ISDN interfaces, Wireless Local Loop and other digitized speech systems.

U.S. Patent Application Publication No. 2002/0041667, entitled "Method and system for remotely accessing and controlling remote devices", by Gamble, describes an application where a DTMF encoder converts digits into distinct DTMF tones. Another document illustrating a method for encoding English language and punctuation symbols into DTMF tones is U.S. Pat. No. 6,396,921, entitled "Method and system for encoding and decoding typographic characters", by Longster.

Figure 2:
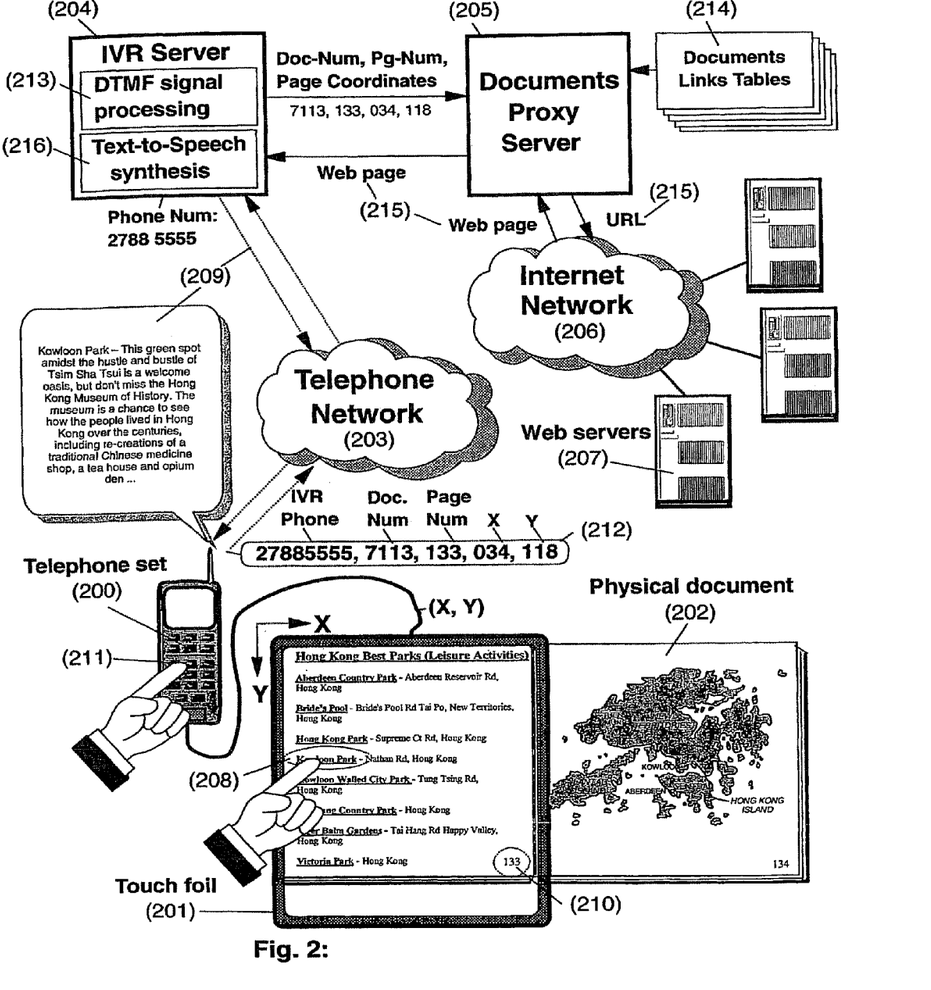
FIG. 2 illustrates information exchanged between the main components in accordance with one embodiment of the present invention.

In one embodiment of the invention, techniques similar to those described in the documents mentioned hereinabove are applied to encode and to transmit from telephone set (200) numerical string (212) encoded as a sequence of DTMF tones, such as the sequence of decimal digits: 27885555, 7113, 133, 034, 118.

FIGS. 2 and 5 illustrate how telephone set (505) is provided with means for receiving, and storing an IVR service phone number (507) (e.g. 27885555), the document number (508) (e.g. 7113), and the selected page number (509) (e.g. 133) as a string of digits entered by the user on the telephone keypad in a conventional manner, and also with means for receiving, and storing X,Y coordinates (510) (e.g. 034, 118) sensed by touch foil (501), corresponding to a point touched by the user. FIG. 5 also illustrates how telephone set (505) is provided with means for concatenating this data, thus forming dial string (513) (e.g. 27885555, 7113, 133, 034, 118) identifying marked (i.e. hyperlinked) item (208) selected by the user on page (210) of physical document (202), for dialing IVR server (204) phone number (e.g. to phone number 27885555), and for transmitting to IVR server (204) dial string (212), encoded as a sequence of DTMF tones.

As shown in FIG. 2, through telephone network (203), telephone set (200) communicates with IVR server (204). IVR server (204) includes DTMF signal processing component (213) for receiving and decoding numerical string (212) encoded as a sequence of DTMF tones. During operation of the system, by means of phone set (200) the user makes a call to IVR server (204), and then transmits as encoded DTMF tones to IVR server (204), the identification of the selected physical document (102), the number of the selected page, and the coordinates of the point that has been pressed by the user on the touch foil (101), which was conveniently placed over the selected page, such transmission taking place in a manner similar to a traditional use of an IVR using DTMF tones for collecting user input.

IVR server (204) also includes means for receiving text and transforming text to speech by means of text-to-speech synthesis component (216). Electronic document (215) (in one example, a web page) linked to marked item (208) selected by the user is received and converted to synthetic voice (209) which is transmitted by the phone connection established across telephone network (203), being finally received on telephone set (200) and reproduced to the user.

Transforming a web page to speech utilizing text-to-speech synthesis component (216), implemented using VoiceXML processing, is accomplished by converting the structure of the received web page into audio content that a user can easily listen to, permitting the user to access and obtain information in a manner similar to listening to a radio. When a designated target page is obtained from a web server, a VoiceXML generation module may convert the target page into a VoiceXML document, and a VoiceXML browser may perform a speech response process for the VoiceXML document. Speech from the VoiceXML browser will be outputted to the telephone.

The following technologies could be utilized to implement the functions required on IVR server (204) of the invention. IVR systems may be defined to include automated processing systems capable of carrying out operations in response to the human voice or DTMF tones (also known as "touchtones") throughout a telephone network. IVRs implemented using DTMF computer menu systems are in common use today to help in responding to telephone inquiries by people without the need for a human operator.

Most people are familiar with automated telephone services provided by IVR systems. These services allow users to retrieve information such as bank balances, flight schedules, and movie show times from any telephone. A simple example of such a system is a voice-activated dialer, which responds to a user speaking the name of a person to be called, and automatically dialing the appropriate telephone number. In a business environment, an IVR system gives customers 24-hour a day, 7-day a week access to information and services through a simple touch-tone telephone. By accessing an IVR system, customers can use their telephone keypad to access a wide range of database information or perform on-line transactions. An IVR system can manage incoming telephone calls, for example, by routing routine requests to prerecorded messages or allowing customers to retrieve account information from a database. An IVR application provides an "always-on" tool and can support a huge number of information requests each day. Modern IVR systems bring together voice and fax processing, switching and call-management, database and network technologies, to fulfill all sorts of customers voice and data communication needs. IVR provides access to information with a telephone for people.

The explosive growth of the Internet and WWW technologies, combined with the availability of IVR systems, has shifted the landscape for providers of traditional phone services to a new set of customers accessing information and services through the Web. While in most cases customers still access automated services through the phone, providers are finding it easier to build new services that exploit the power of Web technology. Consequently, rapid progress is being made in the development of a "voice web". The voice web intends to be analogous to (and possibly integrated with) the well-known World Wide Web. However, the information maintained on the voice web will be primarily in audible form, and users will access the information using speech or DTMF tones. More specifically, a user will access the voice web using a telephone or other standard audio equipment to operate a device known as a voice browser. The voice browser will respond to the user's spoken or keyed requests to access information stored on a remote processing system, and will provide the information to the user in audible form, such as in the form of recorded or synthesized speech.

The leading technology on which most "voice web" applications are being built is VoiceXML. With VoiceXML, a standardized, structured speech processing language based on Extensible Markup Language (hereinafter referred to as "XML"), the speech process can be easily performed and an automatic speech input/output system can be constructed that uses a telephone. VoiceXML is designed for creating audio dialogs that feature synthesized speech, digitized audio, recognition of spoken and DTMF key input, recording of spoken input, telephony, and mixed-initiative conversations. The primary goal of VoiceXML is to bring the advantages of Web-based development and content delivery to IVR applications.

VoiceXML technology allows a user to interact with the Internet through speech synthesis and voice-recognition technology. Instead of a traditional browser that relies on a combination of HTML and keyboard and mouse, VoiceXML relies on a voice browser and/or the telephone. Using VoiceXML, the user interacts with a voice browser by listening to audio output that is either prerecorded or computer-synthesized and submitting audio input through the user's natural speaking voice or through a keypad, such as a telephone.

VoiceXML provides a solution to carriers of telephone services and to application developers. By expressing automated voice services using a markup language like VoiceXML, carriers can open up their new Web services to customers using voice interfaces, such as the telephone, while application developers are able to build automated voice services using exactly the same technology they use to create visual Web sites, significantly reducing the cost of construction and delivery of new capabilities for the traditional phone customer.

FIGS. 1 and 2 shows how IVR server (104), (205) is connected to documents proxy server (105), (205), respectively. Server (105), (205) contains a database of documents that can be accessed by the system. For each document of this database, document links table (214) provides a link, for each selectable marked item (208) on each page (210) of physical document (202) having a page number and item page coordinates, with a Universal Resource Locator (hereinafter referred to as "URL") of a Web page.

During operation of the system, document proxy server (105), (205) determines, from document number (109), selected page number (210), and pressed point (208) coordinates received from IVR server (104), the hyperlink that has been triggered by the user on physical document (202). The system then identifies from document links table (214), URL (215) of the selected hyperlink and sends a request through Internet Network (106) for accessing web page (215) from corresponding Web server (107).

Requested web page (215) is received by document proxy server (205) and sent to IVR server (204) where, by means of text-to-speech synthesis (216), web page (215) is converted to synthetic voice (209) which is transmitted by the phone connection established across telephone network (203), being finally received on telephone set (200) and reproduced to the user.

IVR server (104) and documents proxy server (105) must be considered as "functional" components, rather than "physical" components of the invention. For those skilled in the art, it should be apparent that the functions of IVR server (104) and documents proxy server (105) can be implemented on the same or on separate computing systems, provided in any case with the software required to implement the functions assigned to each one, as described hereinabove.

As illustrated in FIG. 2, the interlock between both functional components, implemented on the same or on different computing systems, comprises:
1. The IVR server sends to the documents proxy server a user request for a given document (Doc-num), a page of this document (Page-num), and the page coordinates of the item selected on this page.
2. The documents proxy server responds to the IVR server with the web page (or document) corresponding to this request of the user.

While this interlock can be implemented in several different forms, in one embodiment, as shown in FIGS. 1 and 2, two separate and network connected computing systems implement, respectively, the IVR server functions and the document proxy server functions of the invention. In this embodiment, communication of IVR server (104) with documents proxy server (105) can be implemented by a local connection (e.g. by means of a LAN when both systems are in the same building), or remote (e.g. across the Internet, when both systems are remotely placed). Communication protocol, may be TCP/IP, or any other suitable protocol for communicating between computers (e.g. SNA, serial, Xmodem, Kermit, MNP, and CCITT V.42, . . . or any other among the many today available data communication protocols).

Figure 6:
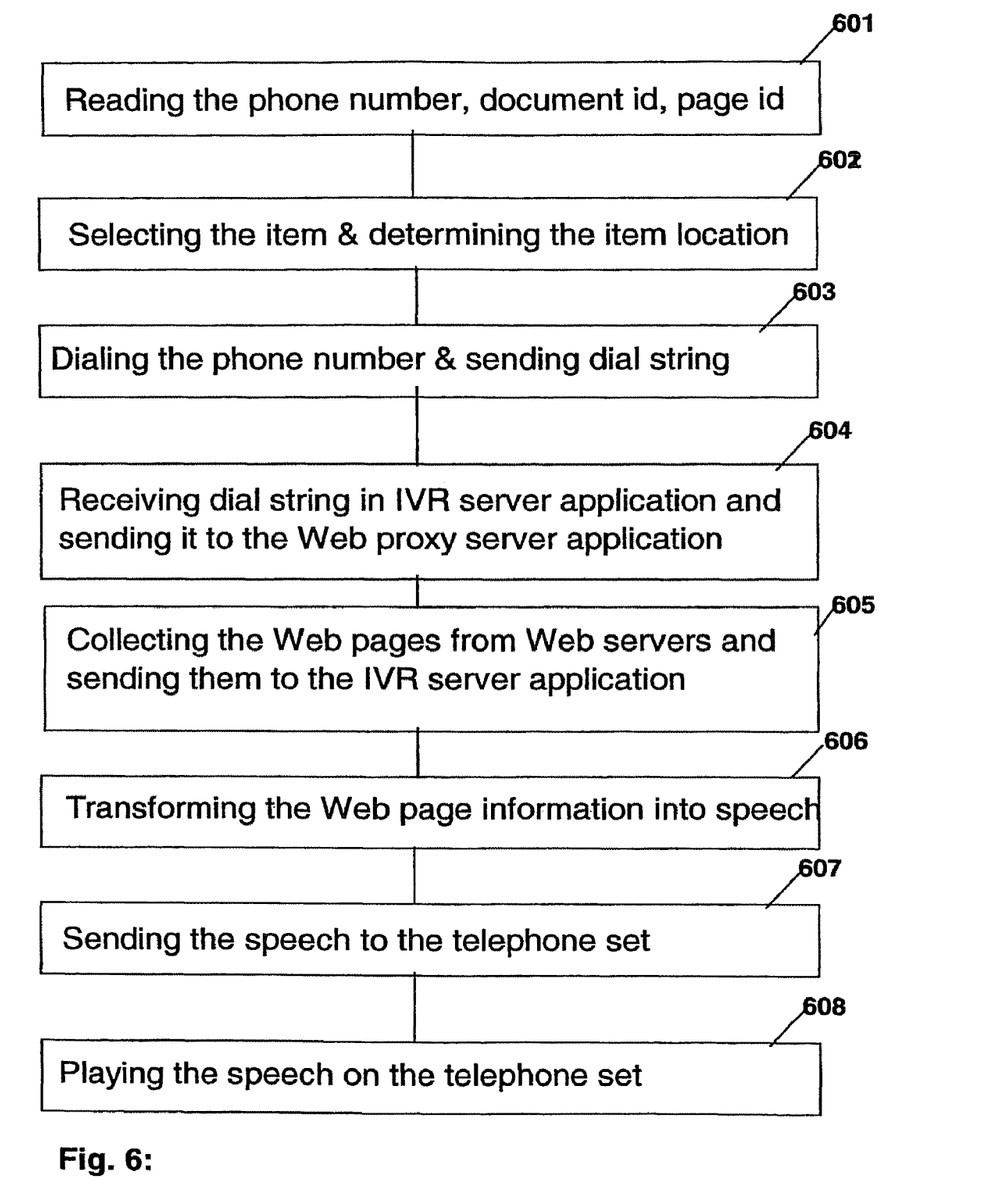
FIG. 6 is a general flow chart of the method in accordance with one embodiment of the present invention.

A method for providing telephonic access to information related to items marked on physical documents is disclosed, comprising linking items (208) marked on a physical document (202) or on any other physical surface, with audible, telephonically accessible, related (i.e. hyperlinked) information (209). This method is implemented in a telephone set, an IVR server application and a Web proxy server application. As shown in FIG. 6, a method to access information and/or services directly from items marked on pages of a physical document comprises the following:

The user selects a physical document having at least one page in step (601), by entering on the user device the telephone number as well as the document identifier read on the document. A page of the physical document is selected by the user by entering the page number read on the selected page. In one embodiment, the phone number, the document and page identifiers are dialed on the telephone set.

An item located on the selected page is selected by the user on the user device which determines the location information of the item in step (602). In one embodiment, to select the item on the page, the user touches a touch foil which is connected to a telephone set, preferably through a wireless connection such as with the blue-tooth protocol. The user device, the touch foil in one embodiment, determines the selected item location information which are coordinates from the touch foil.

The telephone set receiving this information automatically establishes a telephone communication with an IVR server containing an IVR server application in step (603). The document identifier, the page identifier, and the item location information is then encoded using DTMF tone encoding, which the user device sends to the IVR server application as a dial string using the telephone connection already established.

The IVR server application, when receiving the dial string from the telephone set of the user device, decodes the dial string into a character string and sends it to a Web proxy application in step (604). In one embodiment, the IVR server application is operating on a computer which operates the IVR server application, and the Web proxy application operates on a computer used as a Web proxy server. Preferably, the communication between the computers is under TCP/IP protocol through the Internet but any network communication protocol may be used. The application-to-application communication between the IVR server and Web proxy server applications is implemented using the network communication protocol.

The Web proxy server application uses a documents link table in step (605) to store, for each document-page-item combination, the address or addresses (preferably a URL) where the information is stored. The Web proxy server collects information from other Web servers of the Internet network storing the information corresponding to the item. The Web proxy server application sends back the Web pages which have been collected to the IVR server application.

The IVR server application includes a program performing text-to-speech transforming. Such programs are known, and further description is not believed necessary. The Web page content is transformed into speech in step (606).

The speech resulting from the transformed Web page content is sent by the IVR server application to the user device in step (607), through the telephone network under the connection already established. The speech is played for the user on the telephone set of the user device in step (608).

The selection of a page or of an item on the page can be repeated. The corresponding dial string is each time updated with the new page identifier or the new item location information. The same telephone connection already established with the IVR server application corresponding to the physical document is used for getting the new item information.

As shown in FIG. 2, to ask for additional information related with an item (208) marked (e.g. the underlined term Kowloon Park) on a page (210) of a physical document (202), the user dials IVR service phone number (211) (e.g. 27885555, which is known by the user and/or is printed (108) on the cover or on a known page of the same physical document (102), (202)), followed by the physical document identification number (e.g. 7113, which may also be printed on the same physical document), and followed by the selected page number (210) (e.g. 133). The user then selects an item (208) marked (i.e. hyperlinked) on the selected page by pressing over the printed item (in one example, by using a fingertip), having the touch foil (201) placed aligned over (or under) the physical document. When marked item (208) is selected in this manner, telephone set (200) receives from touch foil (201) a signal indicating the position (in one example, X,Y coordinates in mm) on the page of the point pressed by the user (e.g. X=34 mm, Y=118 mm).

By concatenating on telephone set (200), the IVR service phone number (e.g. 27885555), the document number (e.g. 7113), the page number (e.g. 133), and the X,Y coordinates (e.g. 034, 118) sensed by the touch foil, corresponding to the point touched by the user, dial string (212) (e.g. 27885555, 7113, 133, 034, 118) identifying the item marked (i.e. hyperlinked) (208) selected by the user on page (210) of physical document (202) is entered on telephone set (200). Telephone set (200) then makes a call to IVR server (204) phone number (e.g. to the phone number 27885555), and transmits to the IVR server (encoded as DTMF tones), encoded dial string (212).

When IVR server (204) receives dial string (212), a DTMF signal processing component (213) parses and decodes the DTMF tones encoded in dial string (212). The decoded components corresponding to the physical document identification number (e.g. 7113), the selected page number (e.g. 133), and the touch foil sensed point coordinates (e.g. 034, 118) are transmitted to documents proxy server (205) from IVR server (204). As mentioned hereinabove, documents proxy server (205) stores database (214) of physical documents that may be accessed through IVR server (204).

Figure 3:
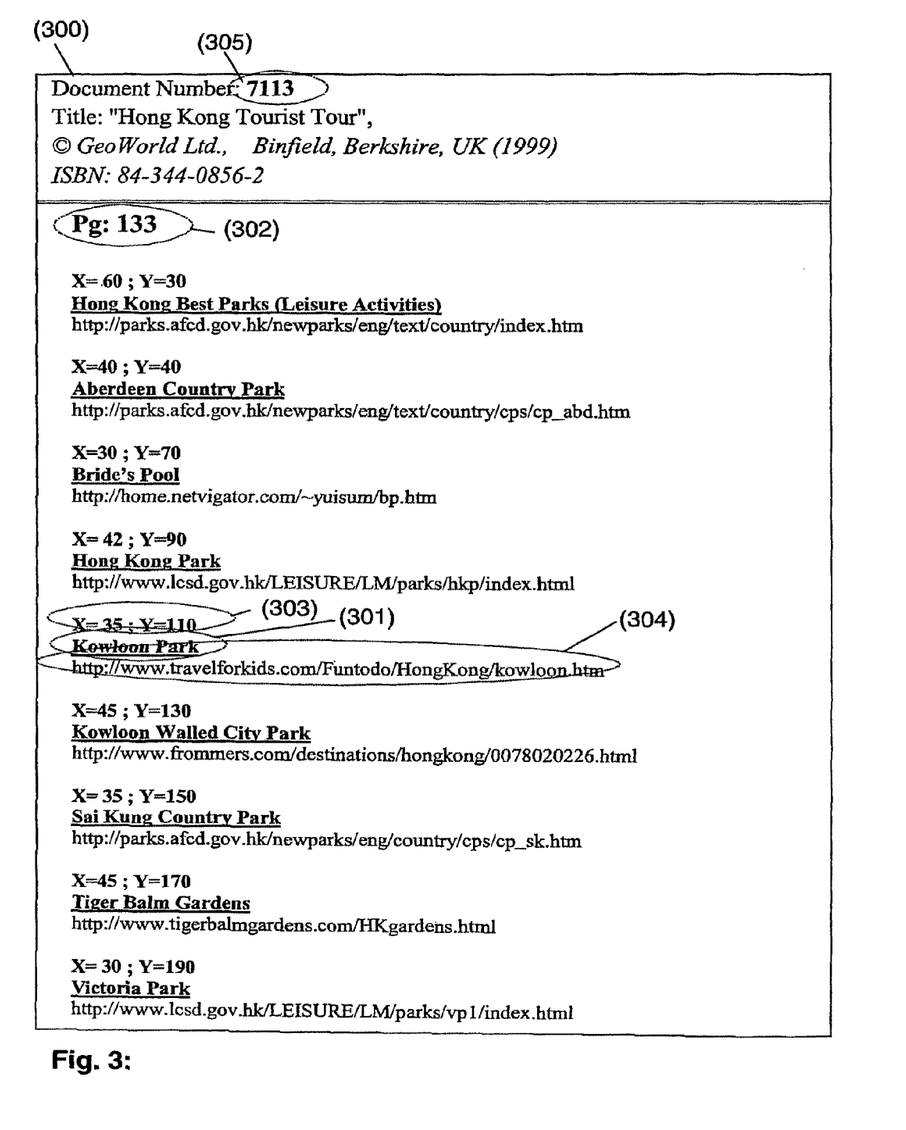
FIG. 3 illustrates a Document Link Table stored on a Documents Proxy Server, in accordance with one embodiment of the present invention.

As shown in FIG. 3, for each physical document referenced in the documents database stored on documents proxy server (205), document links table (300) links each marked (i.e. hyperlinked) item (208), (301) that can be selected on each page (210), (302) of physical document (202), with reference coordinates (303) of the marked item on the physical page, and with URL (304) of the web page hyperlinked to said marked item.

When documents proxy server (205) receives from IVR server (204), physical document identification number (109) (e.g. 7113), selected page number (210), (302) (e.g. 133), and the coordinates sensed by the touch foil of the point pressed by the user over the physical page (e.g. 034, 118), using coordinates (303) of hyperlinked item tabulated on document links table (300) of selected document (305), documents proxy server (205) determines from the records of selected page number (210), (302) (e.g. 133), which hyperlinked item (301) is the nearest (i.e. is at a minimum geometric distance) to the received sensed point coordinates (e.g. 034, 118). In the illustrative example shown in FIGS. 2 and 3, the nearest hyperlinked item to the received sensed coordinates X=034, Y=118, on page 133 of document 7113, which will be identified by the system, corresponds to the hyperlinked item named Kowloon Park, defined as having been printed on point X=035, Y=110 of physical document (202). Using URL (304) of the identified hyperlink, document proxy server (205) sends request (215) through Internet network (206) for accessing the hyperlinked Web page from Web server (207).

Once the requested Web page is retrieved from the web by documents proxy server (215), it is forwarded to IVR server (204) where, by means of text-to-speech synthesis component (216), it is transformed to synthetic voice (209) which is transmitted by the dial connection established across telephone network (203), and received by phone set (200) where the requested verbal information (209) is played and perceived by the user.

Figure 7:
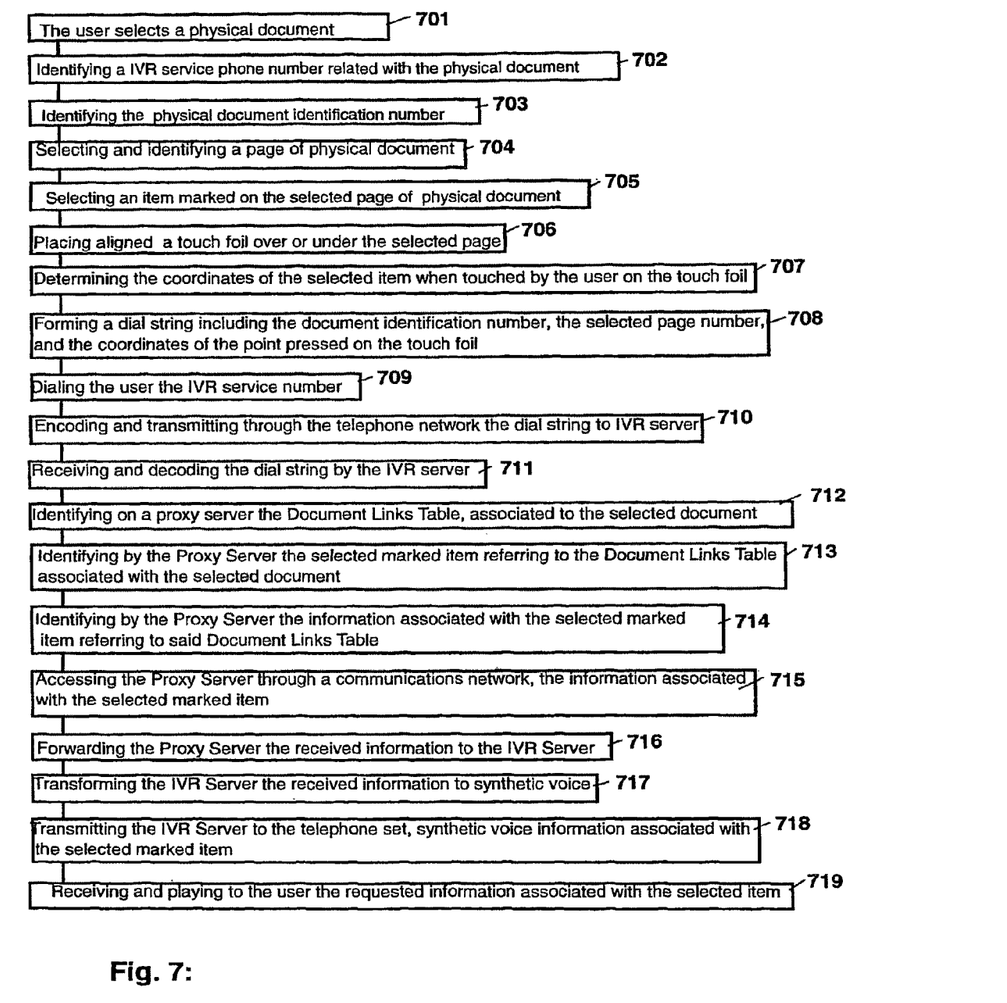
FIG. 7 is a detailed flow chart in accordance with one embodiment of the present invention.

A detailed flow chart according to the present invention is shown in FIG. 7. In step (701) the user selects a physical document. In step (702) an IVR service phone number related with the physical document is identified. In step (703) the physical document identification number is identified. In step (704) a page of the physical document is selected and identified. In step (705) an item marked on the selected page of the physical document is selected. In step (706) a touch foil is placed and aligned over or under the selected page. In step (707) the coordinates of the selected item when touched by the user on the touch foil are determined. In step (708) a dial string is formed which includes the document identification number, the selected page number, and the coordinates of the point pressed on the touch foil. In step (709) the user dials the IVR service number. In step (710) the dial string is encoded and transmitted through the telephone network to the IVR server. In step (711) the dial string is received and decoded by the IVR server. In step (712) the document links table associated to the selected document is identified on a proxy server. In step (713) the selected marked item referring to the document links table associated with the selected document is identified by the proxy server. In step (714) the information associated with the selected marked item referring to the document links table is identified by the proxy server. In step (715) the information associated with the selected marked item is accessed by the proxy server through a communications network. In step (716) the received information is forwarded by the proxy server to the IVR server. In step (717) the IVR Server transforms the received information to synthetic voice. In step (718) the IVR server transmits synthetic voice information associated with the selected marked item to the telephone set. In step (719) the user receives and plays the requested information associated with the selected item.

The invention claimed is:

1. A system for accessing information located on at least one web server through a network, wherein the information corresponds to an item printed or marked on a page of a physical document, the system comprising:

a telephone set connected to the network for dialing a phone number, a document identifier printed on the physical document, and a page identifier printed on a page of the physical document;

a touch foil connected to the telephone set for touching a location of an item printed or marked in the page of the physical document, and further for computing coordinates of the touched item location and communicating the coordinates to the telephone set;

an IVR server application for receiving a dial string encoding an item identification comprising the physical document identifier, the page identifier, and the touched item location coordinates, and further for decoding and parsing the item identification from the dial string;

a web proxy server application for receiving from the IVR server application the item identification, and for collecting one or more web pages corresponding to the item identification from the at least one web server, and further for sending the web pages to the IVR server application;

a text-to-speech synthesis application for transforming the web pages received by the IVR server application into synthetic voice information, and further for sending the voice information to the telephone set using the network, wherein the telephone set plays the voice information.

2. The system of claim 1, wherein the connection between the touch foil and the telephone set is a blue tooth protocol based connection.

3. The system of claim 1, wherein the IVR server application and the text-to-speech synthesis application operate on a first computer, wherein the web proxy server application operates on a second computer, and wherein the first computer and the second computer communicate using TCP/IP communication protocol through the Internet network.

* * * * *